United States Patent [19]
Gertisser

[11] 3,909,192
[45] Sept. 30, 1975

[54] STABLE LIQUID DYESTUFF PREPARATIONS

[75] Inventor: Berthold Gertisser, Muenchenstein, Switzerland

[73] Assignee: Sandoz Ltd., Basel, Switzerland

[22] Filed: Aug. 23, 1972

[21] Appl. No.: 283,084

Related U.S. Application Data

[63] Continuation-in-part of Ser. No. 215,081, Jan. 3, 1972, abandoned.

[52] U.S. Cl.................... 8/90; 8/177 AB; 8/180; 8/173
[51] Int. Cl.................................. D06p 1/68
[58] Field of Search................... 8/169, 173, 93

[56] References Cited
UNITED STATES PATENTS

| | | | |
|---|---|---|---|
| 1,635,628 | 7/1927 | Luttin | 8/92 |
| 3,346,322 | 10/1967 | Finkenauer | 8/93 |
| 3,758,272 | 9/1973 | Datye | 8/173 |

*Primary Examiner*—Donald Levy
*Attorney, Agent, or Firm*—Gerald D. Sharkin; Richard E. Vila; Joseph J. Borovian

[57] ABSTRACT

The invention provides novel stable, liquid dyestuff preparations comprising (a) at least one basic dyestuff of the polymethine series present in the form of a salt of an inorganic acid or of an alkylsulphuric acid in which the alkyl radical contains 1 to 4 carbon atoms, (b) at least one water-soluble organic acid and (c) γ-butyrolactone. The preparations are useful for dyeing polyacrylonitrile, acrylonitrile copolymer, polyester and polypropylene fibres.

8 Claims, No Drawings

STABLE LIQUID DYESTUFF PREPARATIONS

This application is a continuation-in-part of copending application Ser. No. 215,081, filed Jan. 3, 1972 now abandoned.

This invention relates to stable, liquid dyestuff preparations.

More particularly, this invention provides a stable, liquid dyestuff preparation comprising (a) at least one basic dyestuff of the polymethine series present in the form of a salt of an inorganic acid or of an alkylsulphuric acid in which the alkyl radical contains 1 to 4 carbon atoms, (b) at least one water-soluble organic acid and (c) γ-butyrolactone.

Suitable inorganic acid salt forms include the chloride and sulphate. The alkyl radical in the alkylsulphuric acid preferably contains 1 to 2 carbon atoms.

The preferred salts of basic dyestuffs of the polymethine series for use in the preparations of the invention, include those of formula I,

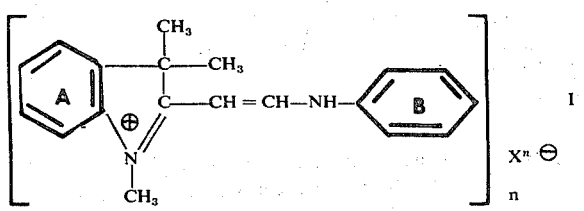

in which $X^{n\ominus}$ signifies the anion of an inorganic acid or of an alkylsulphuric acid in which the alkyl radical contains 1 to 4 carbon atoms, ring A is optionally substituted by one or more non-water-solubilising substituents, ring B is optionally substituted by one or more alkoxy groups of 1 to 6 carbon atoms, and n signifies 1, 2 or 3.

Suitable non-water-solubilising substituents in Ring A include the following: halogen, i.e., fluorine, bromine, iodine and, particularly, chlorine, nitro, amino, cyano, thiocyano, hydroxyl, alkyl, alkoxy, trifluoroalkyl, trichloroalkyl, phenyl, aralkyl, phenyloxy, alkylamino, dialkylamino, phenylamino, acyl, acyloxy, acylamino, e.g., urethane, alkylsulphonyl, arylsulphonyl, e.g., phenylsulphonyl, sulphonamido, alkylsulphonamido, dialkylsulphonamido, arylsulphonamido, e.g., phenylsulphonamido, or arylazo, e.g., phenylazo, diphenylazo and naphthylazo, any alkyl radical present containing 1 to 6 and preferably 1 to 4 carbon atoms and being optionally substituted, e.g., by halogen, hydroxyl or cyano substituents, and any aralkyl radical present suitably being a phenylalkyl radical, such as the benzyl radical.

Any alkoxy substituent on ring A or B contains 1 to 6, preferably 1 to 3 carbon atoms.

Particularly preferred salts of basic dyestuffs of the polymethine series include those of formula II,

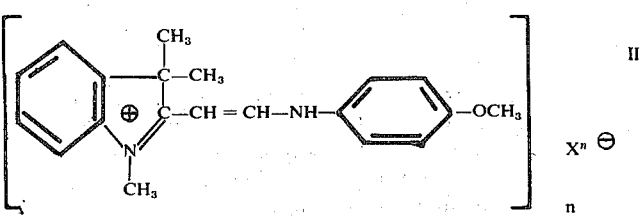

in which $X^{n\ominus}$ and n are as defined above.

Suitable water-soluble organic acids, for use in the preparations of the invention, include aliphatic carboxylic acids of 1 to 6 carbon atoms, e.g., formic, acetic and propionic acids, and aromatic acids, such as benzoic acid.

The concentration of the salt of the basic dyestuff in the preparations of the invention is suitably from 15 to 80, preferably 20 to 50%, especially 20 to 25% by weight, while that of the γ-butyrolactone is suitably from 3 to 20%, preferably 4 to 13% weight. The concentration of the water-soluble organic acid is suitably from 58 to 74%, preferably 62 to 68% by weight.

The preparations of the invention may be produced by mixing the indicated components, if necessary by heating for a short time. The preparations may optionally contain water. Thus, preparations may suitably contain from 0 to 16%, preferably 0 to 13% by weight of water.

The preparations of the invention may after dilution, as required, with water and incorporation of any such conventional dyeing or printing auxiliaries as may be required or desired, be used for dyeing and printing polyacrylonitrile, acrylonitrile copolymer, polyester and polypropylene fibres in loose form, as yarn or in the various textile forms.

The dyestuffs preparations of the present invention have the advantage over similar preparations, e.g., those described in W. German Pat. application No. 1,266,719 (published Apr. 25, 1968), that they require smaller quantities of γ-butyrolactone, and are thus relatively inexpensive to produce, and yet still possess particularly good storage and heat and frost stability. The preparations may thus be stored for several months at room temperature, are unaffected by freezing temperatures and are also unaffected by mould growth. In particular, the present preparations are resistant to crystallisation. Finally, the present preparations have the advantage of ease of handling in that the inconvenient dusting that occurs when powder dyestuffs are weighed out, is obviated.

The following Examples, in which all parts and percentages are by weight and all temperatures are in degrees centigrade, illustrate the invention.

EXAMPLE 1

A mixture of 72 parts of formic acid, 4.1 parts of γ-butyrolactone and 1.9 parts of water is prepared and 22 parts of the dyestuff of formula III,

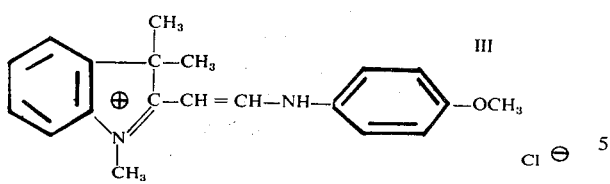

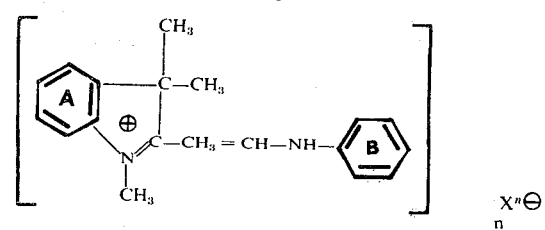

are gradually stirred into it, stirring being continued until dissolution is complete. The resulting dyestuff preparation can be applied to polyacrylonitrile or acrylonitrile copolymer fibres by any of the normal methods to give brilliant yellow dyeings.

EXAMPLE 2

22 Parts of the dyestuff used in Example 1 are gradually added, with stirring, to a mixture of 71 parts of 98% formic acid and 7 parts of γ-butyrolactone until a solution is formed. The resulting dyestuff preparation can be used for dyeing or printing polyacrylonitrile or acrylonitrile copolymer fibres, for example by the method described in French Pat. No. 1,325,176, with similar results to Example 1.

If the said dyestuff is employed in the form of its methylsulphate, a dyestuff preparation of comparable quality is obtained.

EXAMPLE 3

A mixture of 64 parts of 98% formic acid, 12.1 parts of γ-butyrolactone and 1.9 parts of water is prepared and 22 parts of the dyestuff used in Example 1 are mixed with it until fully dissolved. The preparation, which is equal in quality to that of Example 1, can be employed for dyeing or printing polyacrylonitrile and acrylonitrile copolymer fibres.

If the formic acid used in the foregoing Examples is replaced by an equivalent amount of acetic or propionic acid, similar results are obtained.

When the dyestuff employed in Examples 1 to 3 is replaced by a dyestuff of formula IV,

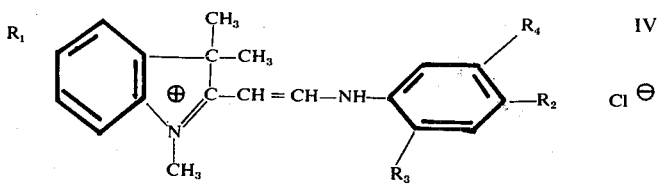

in which $R_1$, $R_2$, $R_3$ and $R_4$ are as defined in the following table, preparations having comparable properties to those of Examples 1 to 3 are obtained.

TABLE

| Exple. No. | $R_1$ | $R_2$ | $R_3$ | $R_4$ | Shade of dyeing on polyacrylonitrile fibre |
|---|---|---|---|---|---|
| 4 | H | OCH$_3$ | OCH$_3$ | H | yellow C.I. 48055 |
| 5 | H | OCH$_3$ | H | OCH$_3$ | yellow |
| 6 | Cl | OCH$_3$ | H | H | yellow |

What is claimed is:

1. A stable liquid dyestuff composition comprising 20 to 25% by weight of a basic dyestuff salt of the formula in which
$X^{n\ominus}$ is the anion of an inorganic acid or an alkylsulphuric acid in which the alkyl radical contains 1 to 4 carbon atoms,
ring A is unsubstituted or substituted by one or more non-water solubilizing substituents selected from the group consisting of halo, nitro, amino, cyano, thiocyano, hydroxyl, alkyl, alkoxy, trifluoroalkyl, trichloroalkyl, phenyl, phenylalkyl, phenoxy, alkylamino, dialkylamino, phenylamino, urethane, alkylsulphonyl, phenylsulphonyl, sulphonamido, alkylsulphonamido, dialkylsulphonamido, phenylsulphonamido, phenylazo, diphenylazo and naphthylazo, any alkyl portion of said substituents containing 1 to 6 carbon atoms and being unsubstituted or substituted by halo, hydroxyl or cyano,
ring B is unsubstituted or substituted by alkoxy of 1 to 6 carbon atoms, and
$n$ is 1, 2 or 3,
3 to 20% by weight of γ-butyrolactone, 58 to 74% by weight of benzoic acid or a water-soluble aliphatic carboxylic acid of 1 to 6 carbon atoms and 0 to 16% by weight water.

2. The composition of claim 1, which comprises from 20 to 25% by weight of the basic dyestuff, from 4 to 13% by weight of the γ-butyrolactone, from 62 to 68% by weight of the water-soluble organic acid and from 0 to 13% by weight of water.

3. A composition according to claim 2 wherein $X^{n\ominus}$ is the anion of sulphuric or hydrochloric acid or of an alkylsulphuric acid of 1 to 2 carbon atoms.

4. The composition of claim 1, in which the basic dyestuff salt is of formula

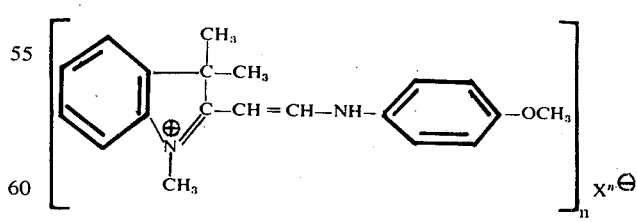

in which
$X^{n\ominus}$ signifies the anion of an inorganic acid or of an alkylsulphuric acid in which the alkyl radical contains 1 to 4 carbon atoms,
$n$ signifies 1, 2 or 3.

5. A composition according to claim 3 wherein any alkyl group on ring A of the dyestuff contains 1 to 4 carbon atoms and any alkoxy group on ring A or B contains 1 to 3 carbon atoms.

6. A composition according to claim 5 wherein any alkyl group on ring A of the dyestuff is unsubstituted.

7. A composition according to claim 2 wherein the water-soluble organic acid is formic, acetic, propionic or benzoic acid.

8. A composition according to claim 2 wherein the dyestuff is of the formula

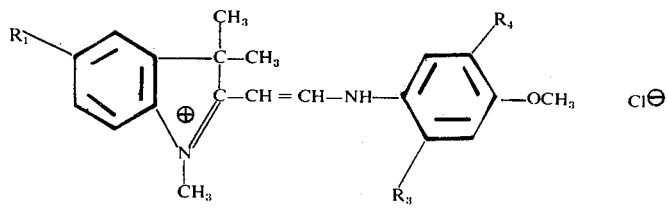

wherein $R_1$ is hydrogen or chloro,
and $R_3$ and $R_4$ are, independently, hydrogen or methoxy.

* * * * *